United States Patent
Al Hunaidy et al.

(10) Patent No.: US 10,622,656 B2
(45) Date of Patent: Apr. 14, 2020

(54) METHOD AND SYSTEM FOR CAPTURING HIGH-PURITY $CO_2$ IN A HYDROCARBON FACILITY

(71) Applicant: Saudi Arabian Oil Company, Dhahran (SA)

(72) Inventors: Ali Shaker Al Hunaidy, Dhahran (SA); Stamatios Souentie, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 197 days.

(21) Appl. No.: 15/730,322

(22) Filed: Oct. 11, 2017

(65) Prior Publication Data

US 2019/0109340 A1    Apr. 11, 2019

(51) Int. Cl.
*B01D 53/00* (2006.01)
*H01M 8/0668* (2016.01)
(Continued)

(52) U.S. Cl.
CPC ........ *H01M 8/0668* (2013.01); *B01D 53/047* (2013.01); *C01B 3/384* (2013.01);
(Continued)

(58) Field of Classification Search
CPC ............ B01D 53/047; B01D 2253/108; B01D 2253/112; B01D 2256/12; B01D 2256/16;
(Continued)

(56) References Cited

U.S. PATENT DOCUMENTS

| 9,077,006 B2 | 7/2015 | Berlowitz et al. |
| 2003/0143448 A1 | 7/2003 | Keefer |

(Continued)

FOREIGN PATENT DOCUMENTS

| EP | 2 210 656 A1 | 7/2010 |
| WO | 2010044113 A1 | 4/2010 |

OTHER PUBLICATIONS

International Search Report and Written Opinion dated Dec. 18, 2018, pertaining to International Application No. PCT/US2018/053101, 15 pages.

*Primary Examiner* — Sharon Pregler
(74) *Attorney, Agent, or Firm* — Dinsmore & Shohl LLP (57) ABSTRACT

Embodiments of methods for capturing high-purity $CO_2$ in a hydrocarbon facility and related systems are provided. The method comprises operating a hydrogen plant to generate a high-purity hydrogen stream and a $CO_2$ rich stream with a $CO_2$ concentration above 30%; introducing the high-purity hydrogen stream into an anode of a molten carbonate fuel cell; introducing the $CO_2$ rich stream and $O_2$ into a cathode of the molten carbonate fuel cell; reacting $CO_2$ and $O_2$ within the cathode to produce carbonate and a cathode exhaust stream from a cathode outlet; reacting carbonate from the cathode with $H_2$ within the anode to produce electricity and an anode exhaust stream from an anode outlet, the anode exhaust stream comprising $CO_2$ and $H_2O$; separating the $CO_2$ in the anode exhaust stream in one or more separators to form a pure $CO_2$ stream and a $H_2O$ stream; and collecting the pure $CO_2$ stream.

20 Claims, 3 Drawing Sheets

(51) Int. Cl.
- *H01M 8/14* (2006.01)
- *B01D 53/047* (2006.01)
- *C01B 3/48* (2006.01)
- *H01M 8/0612* (2016.01)
- *H01M 8/0662* (2016.01)
- *C01B 3/38* (2006.01)

(52) U.S. Cl.
CPC .............. *C01B 3/48* (2013.01); *H01M 8/0618* (2013.01); *H01M 8/0687* (2013.01); *H01M 8/145* (2013.01); *C01B 2203/0233* (2013.01); *C01B 2203/043* (2013.01); *C01B 2203/0415* (2013.01); *C01B 2203/0475* (2013.01); *C01B 2203/066* (2013.01); *C01B 2203/148* (2013.01); *H01M 2008/147* (2013.01)

(58) Field of Classification Search
CPC .... B01D 2257/504; B01D 2259/40005; B01D 53/0446; B01D 53/08; H01M 2008/147; H01M 8/145; H01M 2250/407; H01M 8/04014; H01M 8/04022; H01M 8/04111; H01M 8/0631; H01M 8/0662; H01M 8/0687

See application file for complete search history.

(56) References Cited

U.S. PATENT DOCUMENTS

| | | |
|---|---|---|
| 2011/0223500 A1 | 9/2011 | Uematsu et al. |
| 2011/0268618 A1* | 11/2011 | Finkenrath ........... B01D 53/229 422/169 |
| 2014/0162153 A1 | 6/2014 | Bove |
| 2014/0272629 A1 | 9/2014 | Berlowitz et al. |

* cited by examiner

METHOD AND SYSTEM FOR CAPTURING HIGH-PURITY $CO_2$ IN A HYDROCARBON FACILITY

BACKGROUND

Field

Embodiments of the present disclosure generally relate to a methods and systems for capturing high-purity $CO_2$ in a hydrocarbon facility and more specifically relate to operating a molten carbonate fuel cell (MCFC) with the $H_2$ generated from a hydrogen plant to manage $CO_2$ produced in the hydrogen plants while generating electricity.

Technical Background

Hydrogen is commonly produced in oil refineries and other hydrocarbon treatment facilities as part of plant operations. The hydrogen is generally produced by steam reforming, partial oxidation, auto-thermal reforming and non-catalytic partial oxidation of light hydrocarbons. The hydrogen production process typical additionally produces $CO_2$. The hydrogen and $CO_2$ may be separated yielding a stream of waste $CO_2$ and other non-hydrogen constituents such as methane ($CH_4$) and CO. Common practice is to simply recycle the $CO_2$ containing stream back to a steam reformer to utilize any non converted methane and produce more hydrogen, recycle the $CO_2$ containing stream to a centralized fuel gas system, or vent the $CO_2$ containing stream to the atmosphere. Each of these processes of utilizing the $CO_2$ is inefficient and wasteful as the $CO_2$ does not contribute to effective combustion in the steam reformer or centralized fuel gas system yet carries an immense amount of thermal energy from heating. Additionally, simply venting the $CO_2$ to the atmosphere is environmentally undesirable with the global warming and $CO_2$ emission concerns as well as the vast amount of thermal energy lost from venting heated $CO_2$.

Accordingly, ongoing needs exist for methods and related systems of capturing high-purity $CO_2$ in a hydrocarbon facility and concurrently reducing $CO_2$ emissions.

SUMMARY

Embodiments of the present disclosure are directed to a method for capturing high-purity $CO_2$ in a hydrocarbon facility. Hydrogen and carbon dioxide from a hydrogen plant as well as oxygen are provided to a molten carbonate fuel cell. The carbon dioxide and oxygen form carbonate in the cathode of the molten carbonate fuel cell. The carbonate passes through a molten carbonate electrolyte of the molten carbonate fuel cell and into the anode. The carbonate and hydrogen from the hydrogen plant reacts with the carbonate in the anode to form carbon dioxide and water generating electrons, which are used to generate electricity. In essence, the present method and associate system is able to generate a high purity carbon dioxide stream and electricity from the hydrogen and impure carbon dioxide formed in the hydrogen plant. The generated electricity from the molten carbonate fuel cell may then ultimately be utilized for the operation of the other components of the system. The methods and systems of the present disclosure have industrial applicability, specifically in the Oil, Gas and Power industries by reducing $CO_2$ emissions, generating usable electrical power, and generating a useful pure $CO_2$ stream.

According to one embodiment, a method for capturing high-purity $CO_2$ in a hydrocarbon facility is provided. The method includes operating a hydrogen plant to generate a high-purity hydrogen stream and a $CO_2$ rich stream with a $CO_2$ concentration above 30%, introducing the high-purity hydrogen stream into an anode of a molten carbonate fuel cell, introducing the $CO_2$ rich stream and $O_2$ into a cathode of the molten carbonate fuel cell, reacting $CO_2$ and $O_2$ within the cathode of the molten carbonate fuel cell to produce carbonate and a cathode exhaust stream from a cathode outlet of the molten carbonate fuel cell, reacting carbonate from the cathode of the molten carbonate fuel cell with $H_2$ within the anode of the molten carbonate fuel cell to produce electricity and an anode exhaust stream from an anode outlet of the molten carbonate fuel cell, the anode exhaust stream comprising $CO_2$ and $H_2O$, and separating the $CO_2$ in the anode exhaust stream in one or more separators to form a pure $CO_2$ stream and a $H_2O$ stream, the pure $CO_2$ stream having a purity of 80% to 100% on a molar basis; and collecting the pure $CO_2$ stream.

In a further embodiment, a system for capturing high-purity $CO_2$ in a hydrocarbon facility is provided. The system includes a hydrogen plant to generate a high-purity hydrogen stream at a high-purity hydrogen stream outlet and a $CO_2$ rich stream with a $CO_2$ concentration above 30% at a CO2 rich stream outlet, a molten carbonate fuel cell comprising an anode, a cathode, and a molten carbonate electrolyte, and a separator. The high-purity hydrogen stream outlet is operatively connected to the anode of a molten carbonate fuel cell. The $CO_2$ rich stream outlet is operatively connected to the cathode of the molten carbonate fuel cell. An $O_2$ source stream is operatively connected to the cathode of the molten carbonate fuel cell. The molten carbonate fuel cell is configured for reaction of $CO_2$ from the hydrogen plant and $O_2$ from the $O_2$ source stream within the cathode of the molten carbonate fuel cell to produce carbonate and a cathode exhaust stream from a cathode outlet of the molten carbonate fuel cell. The molten carbonate fuel cell is configured for reaction of the carbonate from the cathode of the molten carbonate fuel cell with $H_2$ from the hydrogen plan within the anode of the molten carbonate fuel cell to produce electricity and an anode exhaust stream from an anode outlet of the molten carbonate fuel cell, the anode exhaust stream comprising $CO_2$ and $H_2O$. Finally, the separator includes a separator inlet operatively connected to the anode outlet of the molten carbonate fuel cell, a pure $CO_2$ outlet, and a water outlet, the separator configured to separate the anode exhaust stream to form a pure $CO_2$ stream and a $H_2O$ stream, the pure $CO_2$ stream having a purity of 80% to 100% on a molar basis.

Additional features and advantages of the embodiments described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together

DETAILED DESCRIPTION

Figure 1:
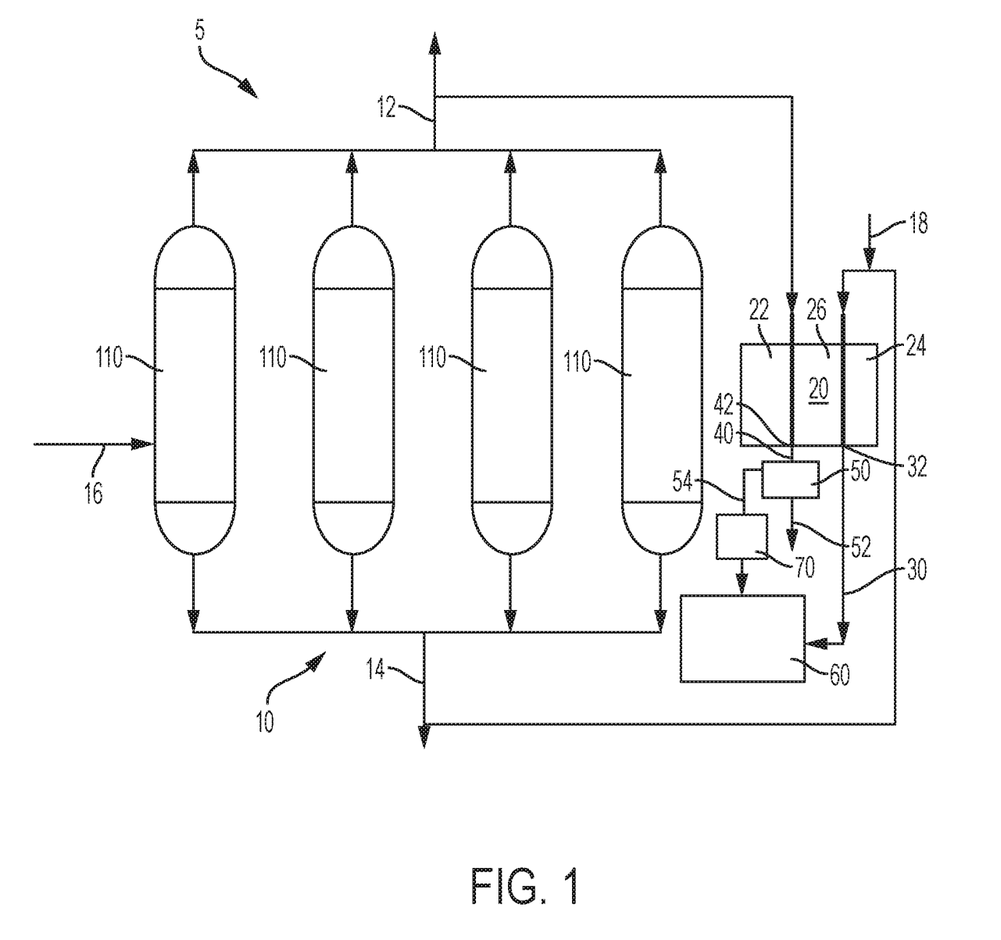
FIG. 1 is a schematic illustration of a system for capturing and purifying CO$_2$ in accordance with one or more embodiments of the present disclosure.
Figure 2:
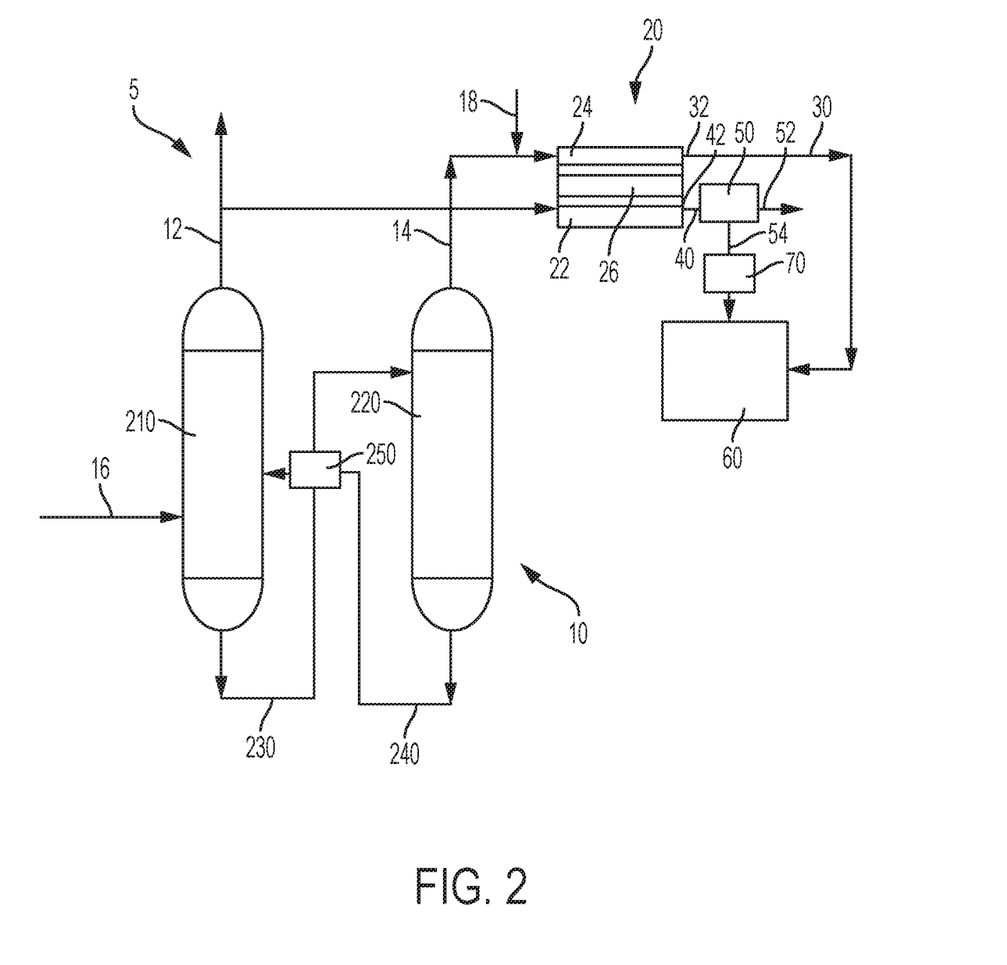
FIG. 2 is a schematic illustration of a system for capturing and purifying CO$_2$ in accordance with one or more embodiments of the present disclosure.

Reference will now be made in detail to embodiments of the method for capturing CO$_2$ to produce high-purity CO$_2$ in a hydrocarbon facility of the present disclosure and associated system. Though the CO$_2$ capture systems 5 of FIGS. 1 and 2 are provided as exemplary, it should be understood that the present systems and methods encompass other configurations.

Hydrogen is produced in oil refineries and other hydrocarbon treatment facilities by a variety of methods. These methods of producing hydrogen include steam reforming, partial oxidation, auto-thermal reforming and non-catalytic partial oxidation of light hydrocarbons as well as other non-conventional methods.

In one or more embodiments, H$_2$ and CO$_2$ are produced via sequential steam reforming and a water gas shift. Specifically, in steam reforming, H$_2$ and CO are produced in a 3:1 ratio from methane (CH$_4$) and water. The combination of H$_2$ and CO is commonly referenced as syngas. Steam reforming produces the H$_2$ and CO from equimolar quantities of CH$_4$ and H$_2$O in accordance with Reaction 1.

$$CH_4 + H_2O \rightarrow 3H_2 + CO \quad \text{(Reaction 1)}$$

To enhance overall H$_2$ production, the produced syngas from Reaction 1 undergoes a water gas shift step. In the water gas shift, CO is converted to CO$_2$ in accordance with Reaction 2.

$$CO + H_2O \rightarrow H_2 + CO_2 \quad \text{(Reaction 2)}$$

The hydrogen gas (H$_2$) generated from the sequential steam reforming and water gas shift or other hydrogen production method may be separated and purified. H$_2$ purification may be achieved using a variety of CO$_2$ removal and H$_2$ separation systems, where a CO$_2$ rich stream is produced. The CO$_2$ rich stream may have a concentration of up to 75% CO$_2$ along with a mixture of other gases. The purification and separation of the H$_2$ is completed in a hydrogen plant where a high-purity hydrogen stream and the CO$_2$ rich stream are generated.

Traditionally the CO$_2$ rich stream generated at the hydrogen plant is recycled back to the steam reformer for inclusion with a feed to the reformer burners or vented to the atmosphere. Recycling the CO$_2$ back to the reformer increases the overall energy consumption of the hydrocarbon plant as the CO$_2$ serves as an energy carrier in the form of heat without any benefit for the overall process. The CO$_2$ is heated, but the heating serves to beneficial purpose as the CO$_2$ is simply vented to the atmosphere directly from the purification and separation process in the hydrogen plant or after passing through the reformer burner and out the burner's vent stack. The vented CO$_2$ also has the added detriment of the environmental impact of releasing CO$_2$ into the environment. Further, the vented CO$_2$ may also deteriorate the burners of the steam reformer and the associated tubing die to the corrosive nature of CO$_2$ when steam is present. As such, the CO$_2$ rich stream is utilized in conjunction with a portion of the high-purity hydrogen stream in a molten carbonate fuel cell to produce a high-purity CO$_2$ stream and generate electricity.

In one or more embodiments, a method for capturing high-purity CO$_2$ in a hydrocarbon facility includes operating a hydrogen plant 10 to generate the high-purity hydrogen stream 12 and the CO$_2$ rich stream 14 having a CO$_2$ concentration above 25%. The high-purity hydrogen stream 12 is then introduced into an anode 22 of a molten carbonate fuel cell 20. Concurrently, the CO$_2$ rich stream 14 along with oxygen (O$_2$) 18 is introduced into a cathode 24 of the molten carbonate fuel cell 20. The CO$_2$ and O$_2$ are reacted within the cathode 24 of the molten carbonate fuel cell 20 to produce carbonate and a cathode exhaust stream 30 from a cathode outlet 32 of the molten carbonate fuel cell 20. Subsequently, carbonate from the cathode 24 of the molten carbonate fuel cell 20 passes through a molten carbonate electrolyte 26 and reacts with H$_2$ at the anode 22 of the molten carbonate fuel cell 20 to produce electricity and an anode exhaust stream 40 provided from an anode outlet 42 of the molten carbonate fuel cell 20. The anode exhaust stream 40 may comprise CO$_2$ and H$_2$O. In one or more separators 50, CO$_2$ is separated from the anode exhaust stream 40 to form a pure CO$_2$ stream 52 and an H$_2$O stream 54. The pure CO$_2$ stream 52 may be collected as a food grade CO$_2$, for example.

Each step of the embodiments of the methods for capturing high-purity CO$_2$ in a hydrocarbon facility are now provided in further detail.

In one or more embodiments, the hydrogen plant 10 is a Pressure Swing Adsorption (PSA) system. With reference to FIG. 1, a PSA system comprises a plurality of vessels 110 where selective gas adsorption on adsorbent materials occurs in adsorption beds. The adsorption is a function of the partial pressure of the gas components, the operating temperature, and the physiochemical properties of the gas components and the adsorbent material. The PSA system separates hydrogen from other gases based on the weak adsorption bond strength with the adsorbent of the H$_2$ gas. Highly volatile components with low polarity, like H$_2$, are substantially non-adsorbable compared to molecules such as CO$_2$ and other impurities such as H$_2$, CH$_4$, H$_2$O, and CO which are expected in a feed stream 16 to the PSA system. The disparate polarity and adsorption in the adsorption beds results in a high-purity H$_2$ stream 12 and a separate CO$_2$ rich stream 14 comprising CO$_2$ and impurities exiting the PSA system.

The PSA system may include multiple variations. In at least one embodiment, the PSA comprises 4 to 12 vessels 110 for selective gas adsorption. In further embodiments, the PSA comprises 1 to 20 vessels 110, 2 to 16 vessels 110, 3 to 14 vessels 110, or 5 to 10 vessels 110. It will be appreciated that the number of vessels 110 may be varied based on the flow rate of the feed stream 16 to the PSA system, the size of each vessel 110, the relative concentration of gases in the feed stream 16 to the PSA system, and other parameters. In various embodiments, the adsorbent material of each adsorption bed comprises alumina oxide, silica gel, activated carbon, or molecular sieves for CO and N$_2$.

Operation of the PSA system generates the high-purity H$_2$ stream 12 and the separate CO$_2$ rich stream 14. In various embodiments, the high-purity H$_2$ stream 12 from the PSA system comprises at least 95% hydrogen gas, at least 98% hydrogen gas, at least 99% hydrogen gas, at least 99.5% hydrogen gas, at least 99.9% hydrogen gas, or at least 99.95% hydrogen gas. In various separate or concurrent embodiments, the $CO_2$ rich stream 14 from the PSA system comprises 25 to 75% $CO_2$, 25 to 55% $CO_2$, 35 to 55% $CO_2$, or 45 to 55% $CO_2$. The $CO_2$ rich stream 14 may further comprise one or more of $H_2$, $CH_4$, $H_2O$, and CO.

In one or more embodiments, the hydrogen plant 10 is a Benfield system. With reference to FIG. 2, a Benfield system comprises an absorber 210 and a stripper 220. $CO_2$ is absorbed at the absorber 210 and then stripped at the stripper 220 to separate $CO_2$ and $H_2$ in a feed stream 16 to the Benfield system. Specifically, a solvent is utilized as an absorbent which absorbs $CO_2$ from converted syngas in the absorber 210 and then the solvent is passed to the stripper 220 where the solvent is heated to release the $CO_2$. In at least one embodiment, the solvent is potassium carbonate. The potassium carbonate absorbs $CO_2$ at high pressure to produce potassium bicarbonate in accordance with Reaction 3.

(Reaction 3)

The potassium bicarbonate is passed to the stripper 220 where the potassium bicarbonate is heated at low pressure to release $CO_2$ and regenerate the potassium carbonate in a reverse of Reaction 3. The feed 230 of the potassium bicarbonate from the absorber 210 to the stripper 220 and the return feed 240 of the potassium carbonate from the stripper to the absorber may pass through a heat exchanger 250 to transfer heat between the feed 230 and return feed 240 and reduce required external energy consumption of the Benfield system.

In at least one embodiment, the potassium carbonate may absorb the $CO_2$ in accordance with Reaction 3 at the operating pressure of the reformer converting methane and water to syngas in accordance with Reaction 1. For example, the potassium carbonate may absorb the $CO_2$ at a pressure of 275 to 350 pounds per square inch (psi) at an inlet temperature of approximately 700 to 1000° F. (371 to 538° C.) and outlet temperature of approximately 1400 to 1600° F. (760 to 871° C.). In one or more embodiments, the Benfield system may utilize sodium carbonate in lieu or in addition to potassium carbonate. Subsequently, the generated bicarbonate solution is heated to approximately 200 to 250° F. (93 to 121° C.) and a pressure of approximately 0.5 to 4 psi to release the $CO_2$ and return the potassium bicarbonate to potassium carbonate for return to the absorber 210 for reaction with further $CO_2$.

In one or more embodiments, the Benfield system may additionally utilize an amine in combination with the potassium carbonate to accelerate the absorption rate of $CO_2$ by the potassium carbonate.

In various embodiments, hydrogen may be also produced through other methods such as electrochemical purification system or a porous metal membrane system.

The $CO_2$ rich stream 14 generated in the hydrogen plant 10 may be utilized to produce a pure $CO_2$ stream 52, an $H_2O$ stream 54, and generate power. Implementation of the molten carbonate fuel cell 20 may utilize the $CO_2$ rich stream 14 and a portion of the high-purity hydrogen stream 12 from the hydrogen plant 10 to convert the $CO_2$ rich stream 14 from low to high quality. Specifically, the $CO_2$ rich stream 14 may be processed by utilization in the molten carbonate fuel cell 20 to generate a stream of substantially pure $CO_2$ 52.

Figure 3:
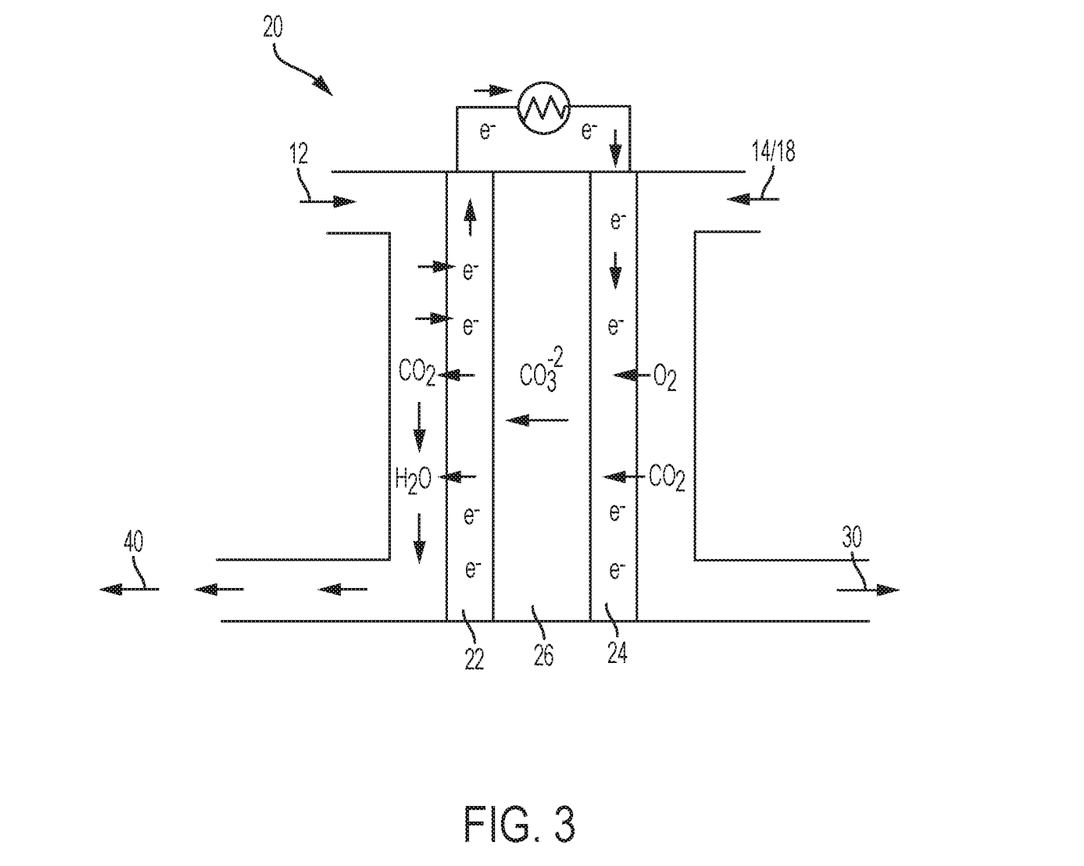
FIG. 3 is a schematic illustration of a molten carbonate fuel cell (MCFC) in accordance with one or more embodiments of the present disclosure.

With reference to FIG. 3, a molten carbonate fuel cell (MCFC) 20 comprises an anode 22, a cathode 24, and a molten carbonate electrolyte 26. Due to the high operating temperatures of MCFC's 20, the materials of the various components need to be specifically selected to survive the conditions present within the fuel cell.

In one or more embodiments, the anode 22 comprises a porous nickel (Ni) based alloy. In various embodiments, Ni may be alloyed with either Chromium (Cr) or Aluminum (Al) to form the Ni based alloy. The alloying metal may be added to the Ni at a range of approximately 2 to 10 percent by weight. It will be appreciated that other transition metal alloys, such as nickel alloys, are also suitable for utilization as an anode 22 in the MCFC 20 with selection dependent on the fuel composition. In one or more embodiments, the anode 22 may comprises pores with an average dimension of approximately 0.1 to 10 micrometers (µm). In further embodiments, the anode 22 may comprises pores with an average dimension of approximately 3 to 6 µm. The anode 22 may also comprise a total porosity of approximately 45 to 70% by volume.

In one or more embodiments, the cathode 24 comprises a porous Ni that is converted to a lithiated nickel oxide. A lithiated nickel oxide comprises lithium intercalated within a NiO crystal structure. In one or more embodiments, the pore size within the cathode 24 is in the range of approximately 1 to 20 µm. In further embodiments, the pore size within the cathode 24 is in the range of approximately 7 to 15 µm. The cathode 24 may also comprise a total porosity of approximately 60 to 70% by volume. The NiO of the cathode 24 may suffer dissolution from reaction with $CO_2$ when the cathode 24 is in contact with the molten carbonate electrolyte 26. This dissolution may lead to precipitation of Ni metal in the electrolyte 26 which is undesirable as Ni metal is electrically conductive and could result in the MCFC 20 being short circuited. Without wishing to be bound by theory, it is believed the addition of MgO to the NiO cathode 24 may limit this dissolution by reducing the solubility of $Ni^{2+}$ in the cathode 24 and a commensurate decrease of precipitation in the electrolyte 26. In a further embodiment, the cathode 24 may comprise a $LiFeO_2$—$LiCoO_2$—NiO alloy which almost completely avoids the problem of Ni dissolution of the cathode 24.

In one or more embodiments, the molten carbonate electrolyte 26 comprises a liquid electrolyte of molten carbonate. In various embodiments, the molten carbonate comprises a lithium (Li) carbonate, a sodium (Na) carbonate, a potassium (K) carbonate, or a combination thereof. In one or more embodiments, the molten carbonate is supported by a ceramic matrix, such as $LiAlO_2$, to contain the molten carbonate of the molten carbonate electrolyte 26 between the anode 22 and cathode 24. The elevated operating temperature of the MCFC 20 is required to produce sufficient ionic conductivity of oxygen through the molten carbonate electrolyte 26. In one or more embodiments, the molten carbonate electrolyte 26 comprises approximately 50 to 62% $Li_2CO_3$ and 38 to 50% $K_2CO_3$. A greater fraction of Li carbonate is used due to its higher ionic conductivity, but is limited to 62% due to its lower gas solubility and ionic diffusivity of oxygen. In one or more embodiments, a sodium carbonate is utilized where the molten carbonate electrolyte comprises approximately 50 to 62% $Li_2CO_3$ and 38 to 50% $Na_2CO_3$.

In operation, the $CO_2$ rich stream 14 and $O_2$ 18 are introduced into the cathode 24 of the molten carbonate fuel cell 20. The resulting $CO_2$ and $O_2$ mixture is converted to $CO_3^{2-}$ ionic species in the cathode 24 of the molten carbonate fuel cell 20. The conversion of $CO_2$ and $O_2$ to $CO_3^{2-}$ is completed in accordance with Reaction 4.

(Reaction 4)

Carbonate ionic species ($CO_3^{2-}$) formed in the cathode 24 of the molten carbonate fuel cell 20 from $CO_2$ and $O_2$ subsequently migrate toward the anode 22 of the molten carbonate fuel cell 20 through the molten carbonate electrolyte 26.

The high-purity hydrogen stream 12 from the hydrogen plant 10 is introduced into the anode 22 of the molten carbonate fuel cell 20. The high-purity hydrogen stream 12 is oxidized by the $CO_3^{2-}$ which was passed from the cathode 24, through the molten carbonate electrolyte 26, and into the anode 22. The carbonate ionic species and the hydrogen react in accordance with Reaction 5 to produce $CO_2$, water, and electricity.

$$H_2+CO_3^{2-} \rightarrow CO_2+H_2O+2e^- \qquad \text{(Reaction 5)}$$

The high-purity hydrogen stream 12 fed to the anode 22 of the molten carbonate fuel cell 20 may comprise up to 5% of non-$H_2$ components in various embodiments. For example, the high-purity hydrogen stream 12 may comprise one or more of water, unconverted hydrocarbon, CO, and $CO_2$ in addition to the $H_2$. The impurities in the high-purity hydrogen stream 12 may affect the efficiency of the anode 22 of the molten carbonate fuel cell 20 as a result of carbon deposition during operation. However, the degradation may be minimized with utilization of tolerant anode materials. Sulfur dioxide ($SO_2$) may also be present as an impurity in the hydrogen stream 12. The sulfur from SO2 may react with Ni or with the other metals in the anode and form NiS species that are electrochemically inactive resulting in MCFC degradation. Additionally, other inert impurities, such as Ar or $N_2$, may exit the anode with the produced $CO_2$.

The introduction of the $CO_2$ rich stream 14 and $O_2$ 18 into the cathode 24 produces carbonate and a cathode exhaust stream 30. As previously indicate, the produced carbonate passes through the molten carbonate electrolyte 26, but the remaining constituents of the feed to the cathode 24 and other reaction products are passed through the cathode outlet 32 as the cathode exhaust stream 30. In one or more embodiments, the cathode exhaust stream 30 comprises methane ($CH_4$), hydrogen ($H_2$), and water ($H_2O$). In some embodiments, the cathode exhaust stream 30 additionally comprises unreacted oxygen ($O_2$) and carbon dioxide ($CO_2$) from the introduced $CO_2$ rich stream 14 and the $O_2$ feed 18.

The $O_2$ 18 may be introduced into the cathode 24 of the molten carbonate fuel cell 20 in a variety of manners. In one or more embodiments, pure or substantially pure $O_2$ 18 is introduced directly into the cathode 24 or the $CO_2$ rich stream 14 before entering the cathode 24. In one or more further embodiments, the $O_2$ 18 is introduced into the cathode 24 of the molten carbonate fuel cell 20 as a constituent component of air in an air stream. Introduction of air directly into the cathode 24 or introduction into the $CO_2$ rich stream 14 before entering the cathode 24 provides oxygen as air typically comprises approximately 20.95% by volume $O_2$.

In one or more embodiments, the ratio of $CO_2$ to $O_2$ in the MCFC is approximately 80 to 20 on a molar basis. In various embodiments, $CO_2$ comprises 50 to 80 mole percentage of the feed to the cathode 24 and $O_2$ comprises 20 to 50 mole percentage of the feed to the cathode 24. The $CO_2$ generally is present at a large molar percentage than the $O_2$ as $CO_2$ activation is more difficult than $O_2$.

The introduction of the high-purity hydrogen stream 12 into the anode 22 produces $CO_2$ and $H_2O$ when reacted with the carbonate passed from the cathode 24 to the anode 22 through the molten carbonate electrolyte 26. The produced $CO_2$ and $H_2O$ form the anode exhaust stream 40 and are exhausted from the anode 22 at the anode outlet 42.

The anode exhaust stream 40 is passed to one or more separators 50 to form a pure $CO_2$ stream 52 and a $H_2O$ stream 54. The separators 50 remove the $H_2O$ from the anode exhaust stream 40 leaving pure $CO_2$. The pure $CO_2$ stream 52 may subsequently be collected and utilized in industry, for examples as a source of food grade $CO_2$. In one or more embodiments, the separator 50 condenses the $H_2O$ from the anode exhaust stream 40 to form the $H_2O$ stream 54 and the pure $CO_2$ stream 52.

In various embodiments, the pure $CO_2$ stream 52 passed from the separators 50 comprises a $CO_2$ concentration of at least 90%, at least 95%, at least 99%, at least 99.9%, or at least 99.95%. In some embodiments, the pure $CO_2$ stream 52 comprises a concentration of hydrocarbons of less than 1%, less than 0.5%, less than 0.1%, less than 0.01%, or less than 0.005%. Similarly, in some embodiments, the pure $CO_2$ stream 52 comprises a concentration of sulfur-based constituents, such as $SO_2$, of less than 1%, less than 0.5%, less than 0.1%, less than 0.01%, or less than 0.005%.

In one or more embodiments, the $H_2O$ stream 54 from the separator 50 is provided to a steam reforming system 60 to generate steam for the steam reforming system 60. As the $H_2O$ stream 54 comprises an elevated temperature after passage from the anode outlet 42, the $H_2O$ stream may be reformed into steam for utilization in the steam reforming system 60 with a reduced energy requirement compared to new virgin water from a municipal tap or reservoir. Additionally, utilizing the recycled $H_2O$ from the anode 22 of the molten carbonate fuel cell 20 reduces load and demand on any existing steam plant within the facility. In an embodiment, the steam reforming system 60 generates the syngas feed 16 to the hydrogen plant 10 from a feed of methane and $H_2O$.

In some embodiments, the method for capturing high-purity $CO_2$ in a hydrocarbon facility may further include boosting the pressure of the $H_2O$ stream 54 from the separator 50 before introduction to the steam reforming system 60. A pressure boosting unit 70 increases the pressure of the recycled $H_2O$ from the anode outlet 42 before introduction to the steam reforming system 60. The pressure is boosted because the inlet pressure of a steam reformer system 60 is typically elevated above atmospheric pressure. The $H_2O$ stream 54 produced in the anode 22 of the molten carbonate fuel cell 20 is substantially at atmospheric pressure and the captured $H_2O$ from the separator 50 is also substantially at atmospheric pressure. In various embodiments, the pressure boosting unit 70 increases the pressure of the recycled $H_2O$ 54, heated into a vapor as steam, to at least 550 psi, at least 600 psi, at least 700 psi, or at least 800 psi before introduction to the steam reformer system 60.

In one or more embodiments, the method for capturing high-purity $CO_2$ in a hydrocarbon facility may further include providing the cathode exhaust stream 30 to the steam reforming system 60 to fuel a burner in the steam reforming system 60. The cathode exhaust stream 30 comprises residual hydrocarbons which may be burned as fuel in the burners of the steam reforming system 60. The cathode exhaust stream 30 when burned in the burners of the steam reforming system 60 generates heat which may be utilized to heat up the steam reforming system 60 and maintain an elevated temperature of the steam reforming system 60. For example, residual methane or hydrogen in the cathode exhaust stream 30 may each be burned resulting in a reduction in fuel needed from an external fuel source as well as reducing waste products from the overall process of capturing high-purity $CO_2$.

In one or more embodiments, constituents of the $CO_2$ rich stream 14 are oxidized in the cathode 24 of the molten carbonate fuel cell 20. For example, $CH_4$, $H_2$, CO, or combinations thereof may be oxidized with the $O_2$ 18 in the cathode 24. Oxidation of constituents of the $CO_2$ rich stream 14 generates heat to raise and maintain the temperature of the molten carbonate fuel cell 20 to a molten carbonate fuel cell operating temperature. In one or more embodiments, the molten carbonate fuel cell operating temperature is in the range of 600° C. to 700° C.

In embodiments, an auxiliary fuel may be utilized to heat up the molten carbonate fuel cell 20 to the molten carbonate fuel cell operating temperature. In one embodiment, the auxiliary fuel may be utilized to power an external burner to generate heat in the molten carbonate fuel cell 20. In a further embodiment, the auxiliary fuel may be provided into the cathode 24 for oxidation with the $O_2$ 18 in the cathode 24 to generate heat. The auxiliary fuel may be any of a variety of hydrocarbons, including $H_2$, $CH_4$, CO, or combinations thereof.

Arithmetic Example

The method for capturing high-purity $CO_2$ in a hydrocarbon facility reduces $CO_2$ emissions from the hydrocarbon facility as well as well as generates electrical power. A hydrogen plant 10 operating as a pressure swing adsorption system capable of processing 100,000 cubic meters per hour ($m^3$/hr) of a gas mixture is assumed. The gas mixture is assumed to have a composition of 72.5% $H_2$ on a volume basis, 20% $CO_2$, 0.6% CO, 5.5% $CH_4$, and 1.4% $H_2O$. For purposes of this example, it is believed the pressure swing adsorption system would recover 90% of the $H_2$ fed to the system with a 99.9% purity. The remaining constituents of the gas mixture feed would be purged into a bottoms product fed to the molten carbonate fuel cell cathode 24 after mixing with air. In this hypothetical case to demonstrate the utility of the disclosed method, a reduction in $CO_2$ emissions of 129,000 tons/year would be expected based on the capture and recovery in the molten carbonate fuel cell 20 as a pure $CO_2$ stream 52. Additionally, the molten carbonate fuel cell 20 would be expected to generate 20 megawatts (MW) of power from operation. The generated power equates to a savings in approximately $2.45 \times 10^9$ standard cubic feet per year (SCFY) of fuel such as natural gas. The steam generated in operation of the molten carbonate fuel cell 20 would also provide approximately $134 \times 10^3$ tons/year of steam savings not required to alternatively be produced. It is estimated that such savings in fuel and steam generation equates to approximately 2,000,000 US dollars (USD) per year.

It should be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for capturing high-purity $CO_2$ in a hydrocarbon facility, the method comprising:

operating a hydrogen plant to generate a high-purity hydrogen stream and a $CO_2$ rich stream with a $CO_2$ concentration above 30%;

introducing the high-purity hydrogen stream into an anode of a molten carbonate fuel cell;

introducing the $CO_2$ rich stream and $O_2$ into a cathode of the molten carbonate fuel cell;

reacting $CO_2$ and $O_2$ within the cathode of the molten carbonate fuel cell to produce carbonate and a cathode exhaust stream from a cathode outlet of the molten carbonate fuel cell;

reacting carbonate from the cathode of the molten carbonate fuel cell with $H_2$ within the anode of the molten carbonate fuel cell to produce electricity and an anode exhaust stream from an anode outlet of the molten carbonate fuel cell, the anode exhaust stream comprising $CO_2$ and $H_2O$;

separating the $CO_2$ in the anode exhaust stream in one or more separators to form a pure $CO_2$ stream and a $H_2O$ stream, the pure $CO_2$ stream having a purity of 80% to 100% on a molar basis; and collecting the pure $CO_2$ stream.

2. The method of claim 1, wherein the method further comprises providing the $H_2O$ stream from the separator to a steam reforming system to generate steam for the steam reforming system.

3. The method of claim 2, wherein the method further comprises boosting the pressure of the $H_2O$ stream from the separator before introduction to the steam reforming system.

4. The method of claim 3, wherein the pressure of the $H_2O$ stream is increased to at least 550 psi.

5. The method of claim 1, wherein the method further comprises providing the cathode exhaust stream to the steam reforming system to fuel a burner in the steam reforming system with residual hydrocarbons in the cathode exhaust stream.

6. The method of claim 1, wherein the hydrogen plant is a pressure swing adsorption system.

7. The method of claim 1, wherein the hydrogen plant comprises an absorber and a stripper to separate $CO_2$ from $H_2$.

8. The method of claim 1, wherein the steam reforming system generates syngas from methane and $H_2O$ as a feed stream to the hydrogen plant.

9. The method of claim 1, wherein the separator condenses the $H_2O$ from the anode exhaust stream to form the pure $CO_2$ stream and the $H_2O$ stream.

10. The method of claim 1, wherein $CH_4$, $H_2$, CO, or combinations thereof in the $CO_2$ rich stream are oxidized in the cathode of the molten carbonate fuel cell to generate heat to raise the temperature of the molten carbonate fuel cell to a molten carbonate fuel cell operating temperature.

11. The method of claim 10, wherein the molten carbonate fuel cell operating temperature is in the range of 600° C. to 700° C.

12. The method of claim 1, wherein the $O_2$ introduced into the cathode of the molten carbonate fuel cell is provided as an air stream.

13. A system for capturing high-purity $CO_2$ in a hydrocarbon facility, the system comprising:

a hydrogen plant to generate a high-purity hydrogen stream at a high-purity hydrogen stream outlet and a $CO_2$ rich stream with a $CO_2$ concentration above 30% at a $CO_2$ rich stream outlet;

a molten carbonate fuel cell comprising an anode, a cathode, and a molten carbonate electrolyte; and a separator;

wherein:
the high-purity hydrogen stream outlet is operatively connected to the anode of a molten carbonate fuel cell;
the $CO_2$ rich stream outlet is operatively connected to the cathode of the molten carbonate fuel cell;
an $O_2$ source stream is operatively connected to the cathode of the molten carbonate fuel cell;
the molten carbonate fuel cell is configured for reaction of $CO_2$ from the hydrogen plant and $O_2$ from the $O_2$ source stream within the cathode of the molten carbonate fuel cell to produce carbonate and a cathode exhaust stream from a cathode outlet of the molten carbonate fuel cell;
the molten carbonate fuel cell is configured for reaction of the carbonate from the cathode of the molten carbonate fuel cell with $H_2$ from the hydrogen plan within the anode of the molten carbonate fuel cell to produce electricity and an anode exhaust stream from an anode outlet of the molten carbonate fuel cell, the anode exhaust stream comprising $CO_2$ and $H_2O$; and
the separator comprises a separator inlet operatively connected to the anode outlet of the molten carbonate fuel cell, a pure $CO_2$ outlet, and a water outlet, the separator configured to separate the anode exhaust stream to form a pure $CO_2$ stream and a $H_2O$ stream, the pure $CO_2$ stream having a purity of 80% to 100% on a molar basis.

14. The system of claim 13, wherein the system further comprises a steam reforming system operatively connected to the water outlet of the separator configured to provide the $H_2O$ stream from the separator to the steam reforming system to generator stream for the steam reforming system.

15. The system of claim 14, the system further comprises a pressure boosting unit configured to raise the pressure of the $H_2O$ stream from the separator before introduction to the steam reforming system.

16. The system of claim 15, wherein the pressure boosting unit increases the pressure of the H2O stream to at least 550 psi before introduction to the steam reforming system.

17. The system of claim 14, wherein the steam reforming system is further operatively connected to the cathode outlet of the molten carbonate fuel cell and is configured to provide the cathode exhaust stream to the steam reforming system to fuel a burner in the steam reforming system with residual hydrocarbons in the cathode exhaust stream.

18. The system of claim 14, wherein the steam reforming system is operatively connected to the hydrogen plant to generate syngas from methane and $H_2O$ as a feed stream to the hydrogen plant.

19. The system of claim 13, wherein the hydrogen plant is a pressure swing adsorption system.

20. The system of claim 13, wherein the hydrogen plant comprises an absorber and a stripper to separate $CO_2$ from $H_2$.

* * * * *

UNITED STATES PATENT AND TRADEMARK OFFICE
CERTIFICATE OF CORRECTION

PATENT NO. : 10,622,656 B2
APPLICATION NO. : 15/730322
DATED : April 14, 2020
INVENTOR(S) : Al Hunaidy et al.

Page 1 of 1

It is certified that error appears in the above-identified patent and that said Letters Patent is hereby corrected as shown below:

In the Specification

In Column 2, Line(s) 41, delete "plan" and insert --plant--, therefor.

In the Claims

In Column 11, Line(s) 17, delete "plan" and insert --plant--, therefor.

Signed and Sealed this
Seventh Day of July, 2020

Andrei Iancu
*Director of the United States Patent and Trademark Office*